United States Patent [19]

Snyder

[11] Patent Number: 5,785,996
[45] Date of Patent: Jul. 28, 1998

[54] FIBER MANUFACTURING SPINNER AND FIBERIZER

[75] Inventor: James G. Snyder, Newark, Ohio

[73] Assignee: Owens Corning Fiberglas Technology, Inc., Summit, Ill.

[21] Appl. No.: 757,203

[22] Filed: Nov. 27, 1996

[51] Int. Cl.[6] ............................................. D01D 5/18
[52] U.S. Cl. .................................. 425/8; 65/521; 65/522;
264/8; 264/172.14; 264/211.1; 425/72.2;
425/131.5; 425/463
[58] Field of Search ............................ 425/8, 66, 72.2,
425/131.5, 378.2, 382.2, 463, 464; 264/8,
211.1, 172.14; 65/455, 459, 460, 461, 470,
521, 522, 523

[56] References Cited

U.S. PATENT DOCUMENTS

| | | | |
|---|---|---|---|
| 2,949,632 | 8/1960 | Kleist et al. | 65/523 |
| 2,998,620 | 9/1961 | Stalego | 65/438 |
| 3,077,092 | 2/1963 | Peyches et al. | 65/459 |
| 3,254,482 | 6/1966 | Stalego | 264/8 |
| 4,046,539 | 9/1977 | Pitt | 65/522 |
| 4,392,878 | 7/1983 | Okuma et al. | 65/460 |
| 4,451,276 | 5/1984 | Barthe et al. | 65/461 |
| 4,534,779 | 8/1985 | Herschler | 65/458 |
| 4,601,742 | 7/1986 | Kaveh | 65/523 |
| 4,627,868 | 12/1986 | Kaveh | 65/461 |
| 4,661,135 | 4/1987 | Mosnier | 65/523 |
| 4,718,930 | 1/1988 | Gartner et al. | 65/384 |
| 4,756,732 | 7/1988 | Barthe et al. | 65/461 |
| 4,759,785 | 7/1988 | Barthe et al. | 65/461 |
| 4,759,974 | 7/1988 | Barthe et al. | 65/460 |
| 5,076,826 | 12/1991 | Teeter | 65/460 |
| 5,263,845 | 11/1993 | Warren | 425/461 |
| 5,468,275 | 11/1995 | Lin et al | 65/497 |
| 5,474,590 | 12/1995 | Lin | 65/202 |
| 5,482,527 | 1/1996 | Czastkiewicz | 65/502 |
| 5,509,953 | 4/1996 | Gavin | 65/521 |
| 5,514,199 | 5/1996 | Houpt | 264/211.1 |
| 5,529,596 | 6/1996 | Loftus et al. | 65/470 |
| 5,582,841 | 12/1996 | Watton et al. | 425/8 |
| 5,595,766 | 1/1997 | Houpt et al. | 425/8 |
| 5,618,328 | 4/1997 | Lin et al. | 264/211.1 |
| 5,647,883 | 7/1997 | Houpt et al. | 425/8 |

FOREIGN PATENT DOCUMENTS 728057   5/1966   Canada .......................... 65/521

*Primary Examiner*—Patrick Ryan
*Assistant Examiner*—Joseph Leyson
*Attorney, Agent, or Firm*—C. Michael Gegenheimer; Curtis B. Brueske

[57] ABSTRACT

A fiber manufacturing apparatus including a spinner, mounted on one end of a rotatable shaft, and a source supplying two streams of at least one molten thermoplastic material to the spinner. The spinner includes a radial extension, a radial wall, and an outer peripheral wall. The radial extension is mounted to and extends radially out from the shaft. The radial wall is mounted to and extends radially out from the radial extension. The radial wall includes an upper surface, a lower surface, and an outer periphery. The peripheral wall is disposed around the outer periphery of the radial wall and has a plurality of orifices for centrifuging fibers from at least one molten thermoplastic material. During the operation of the spinner, the radial extension directs one stream of molten thermoplastic material through at least one flow hole to the lower surface of the radial wall and to orifices of the peripheral wall. As the spinner rotates, another stream of molten thermoplastic material is deposited directly onto the upper surface of the radial wall and travels along the upper surface to orifices of the peripheral wall. The spinner is radially balanced during the centrifuging operation and is less susceptible to thermal stress induced cracking.

21 Claims, 7 Drawing Sheets

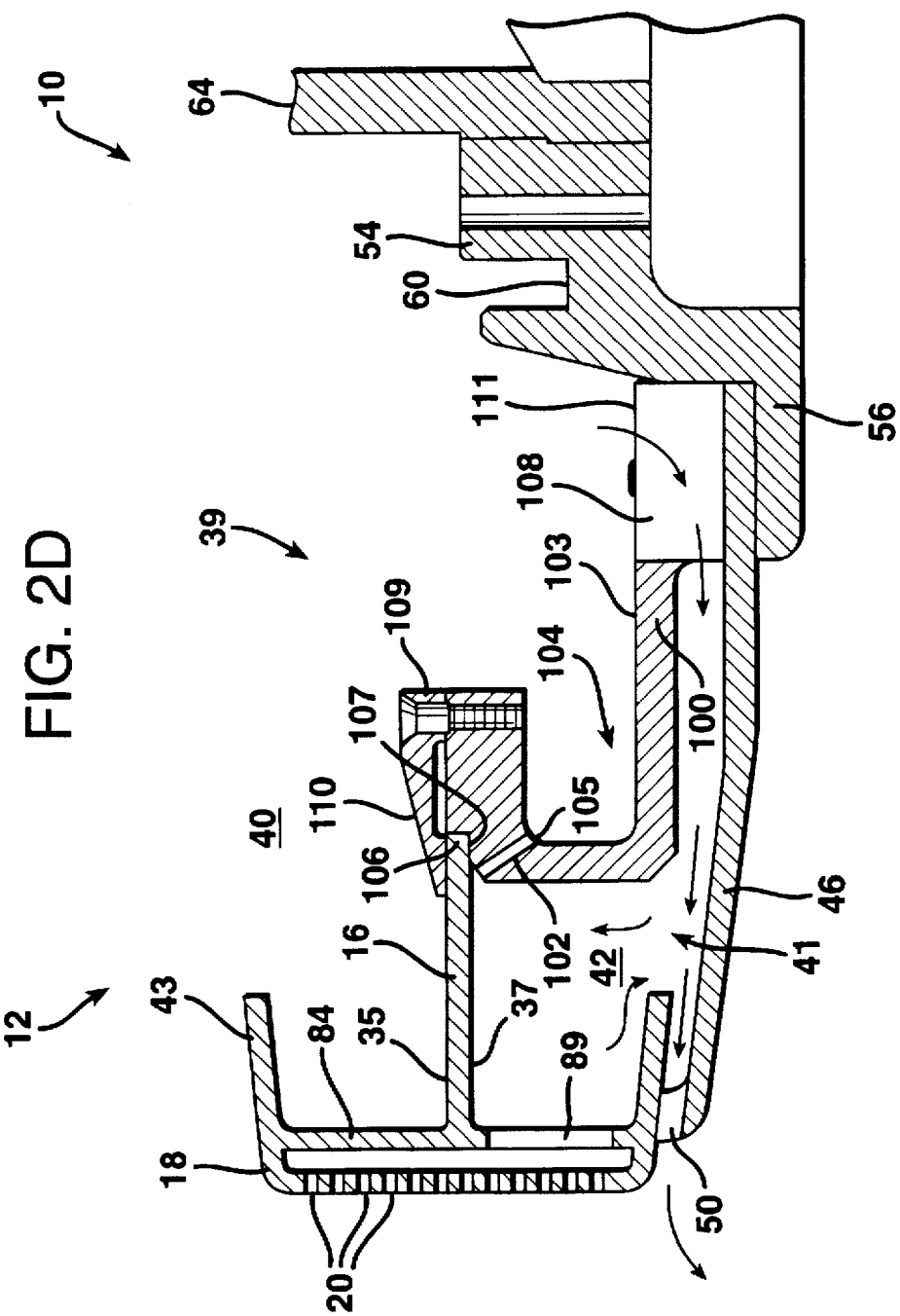

FIBER MANUFACTURING SPINNER AND FIBERIZER

TECHNICAL FIELD

The present invention relates to an apparatus for manufacturing fibers from thermoplastic materials, more particularly to a fiberizer with a spinner for centrifuging single or multiple component fibers from molten thermoplastic materials such as glass or other minerals or polymers, and even more particularly to a radially balanced spinner that is less susceptible to thermal stress cracking.

BACKGROUND OF THE INVENTION

Fibers of glass and other thermoplastic materials are useful in a variety of applications including acoustical or thermal insulation materials. Common prior art methods for producing glass fiber insulation products involve producing glass fibers from a rotary process. A single glass composition or multiple glass compositions are melted and forced through orifices in the outer peripheral wall of a centrifuge, known as a centrifugal spinner, to produce the fibers. One commonly used spinner is generally cup shaped with a bottom wall with a central hole, a top opening and an outer peripheral wall which curves upward from the bottom wall, forming the top opening. The lower end of a drive shaft, used to rotate the spinner, extends down through the top opening and is fixed to the center of the bottom wall with a quill. The central hole of the bottom wall is simply press-fit onto the outside diameter of the quill, and the quill is mounted to the lower end of the drive shaft.

The spinner becomes very hot during the fiber manufacturing process. Because of the high temperatures reached, the spinner walls are necessarily made from a high temperature resistant material, typically a high temperature metal alloy. Even so, at such high temperatures, the spinner exhibits a tendency to creep and sag downward as the spinner rotates. This deformation can significantly reduce the creep life of the spinner and can introduce process variables that adversely impact fiber production. The problem of creep tends to become more pronounced as the size of the spinner increases.

In addition, because it is simply press-fit on to the quill, the spinner has a tendency to loosen around the quill over time, due to thermal expansion, rotational stresses and creep to which the spinner and quill are subjected. As the fit loosens, the spinner moves off-center, resulting in a serious problem of excessive vibration and warping of the spinner. This problem becomes more pronounced as the size of the spinner, and thus the diameter of the central hole, increases.

Furthermore, spinners are often exposed to temperature gradients during their operation. For some spinner designs, these temperature gradients can generate thermal stresses of sufficient magnitude to cause cracks in the spinner.

Accordingly, there is a need for an improved spinner that is less likely to exhibit thermal stress induced cracking and is less likely to exhibit temperature induced deformation that reduces the creep life of the spinner and introduces undesirable process variables during the fiber manufacturing process.

SUMMARY OF THE INVENTION

This need is met by a fiber manufacturing apparatus, often referred to as a fiberizer, of the present invention which includes a centrifuge, commonly known as a spinner, mountable on a shaft so as to rotate, and a source supplying at least one molten thermoplastic material to the spinner. The spinner includes a radial extension, a radial wall and an outer peripheral wall. The radial extension is mountable to the shaft so as to extend radially out therefrom. The radial wall is mounted to and extends radially out from the radial extension and has an outer periphery. The outer peripheral wall is disposed around the outer periphery of the radial wall and has a plurality of orifices for centrifuging fibers from molten thermoplastic material. The radial extension has at least one flow hole operatively adapted for allowing molten thermoplastic material to flow through the radial extension and to orifices of the peripheral wall as the spinner rotates. The present spinner is less susceptible to thermal stress induced cracking.

One apparatus for making fibers according to the present invention includes a shaft, a spinner mounted to the shaft so as to rotate, and a source for supplying molten thermoplastic material to the spinner. The spinner includes a radial extension mounted to and extending radially out from the shaft, a radial wall mounted to and extending radially out from the radial extension, and an outer peripheral wall disposed around the outer periphery of the radial wall. The radial extension has an upper surface and at least one flow hole. The radial wall has an upper surface and an outer periphery. The outer peripheral wall has a plurality of orifices for centrifuging fibers from molten thermoplastic material. The source supplies molten thermoplastic material onto the upper surface of the radial extension and onto the upper surface of the radial wall. The molten thermoplastic material supplied onto the upper surface of the radial extension flows through the at least one flow hole and to orifices of the peripheral wall. The molten thermoplastic material supplied onto the upper surface of the radial wall flows to orifices of the peripheral wall as the spinner rotates.

The objectives, features, and advantages of the present invention will become apparent upon consideration of the description herein and the appended claims and drawings.

BRIEF DESCRIPTION OF THE DRAWINGS

FIG. 2D is a cross-sectional view in elevation showing half of a modification of the spinner embodiment of FIG. 2C, with the section being taken through one of the hot gas circulation openings formed through the rim of the radial extension;

DETAILED DESCRIPTION AND PREFERRED EMBODIMENTS OF THE INVENTION

Although the present invention is herein described in terms of specific embodiments, it will be readily apparent to those skilled in this art that various modifications, re-arrangements, and substitutions can be made without departing from the spirit of the invention. The scope of the present invention is thus only limited by the claims appended hereto.

Figure 1:
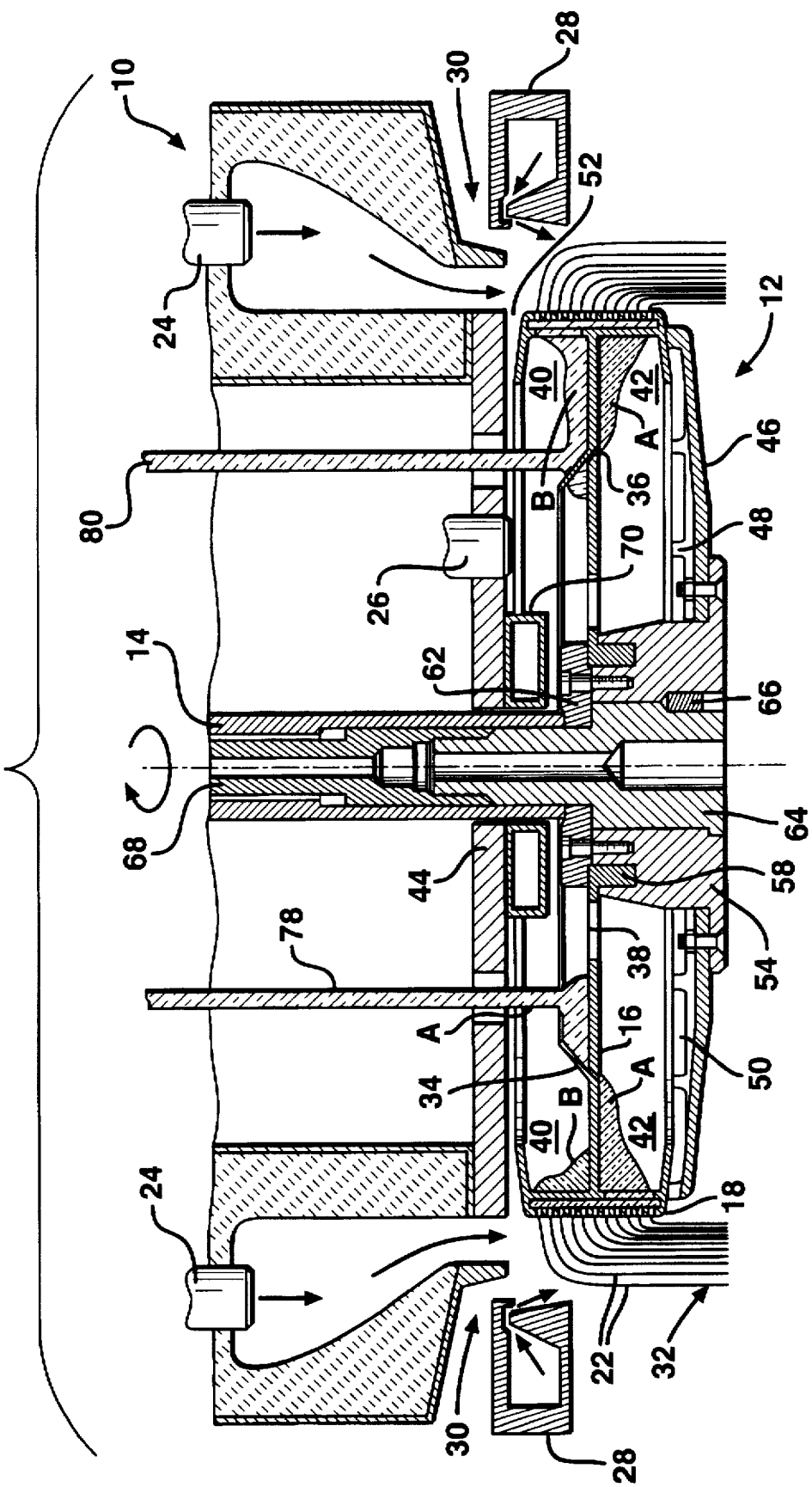
FIG. 1 is a partially schematic cross-sectional view in elevation of a fiberizer with a spinner according to the principles of the present invention.
Figure 2:
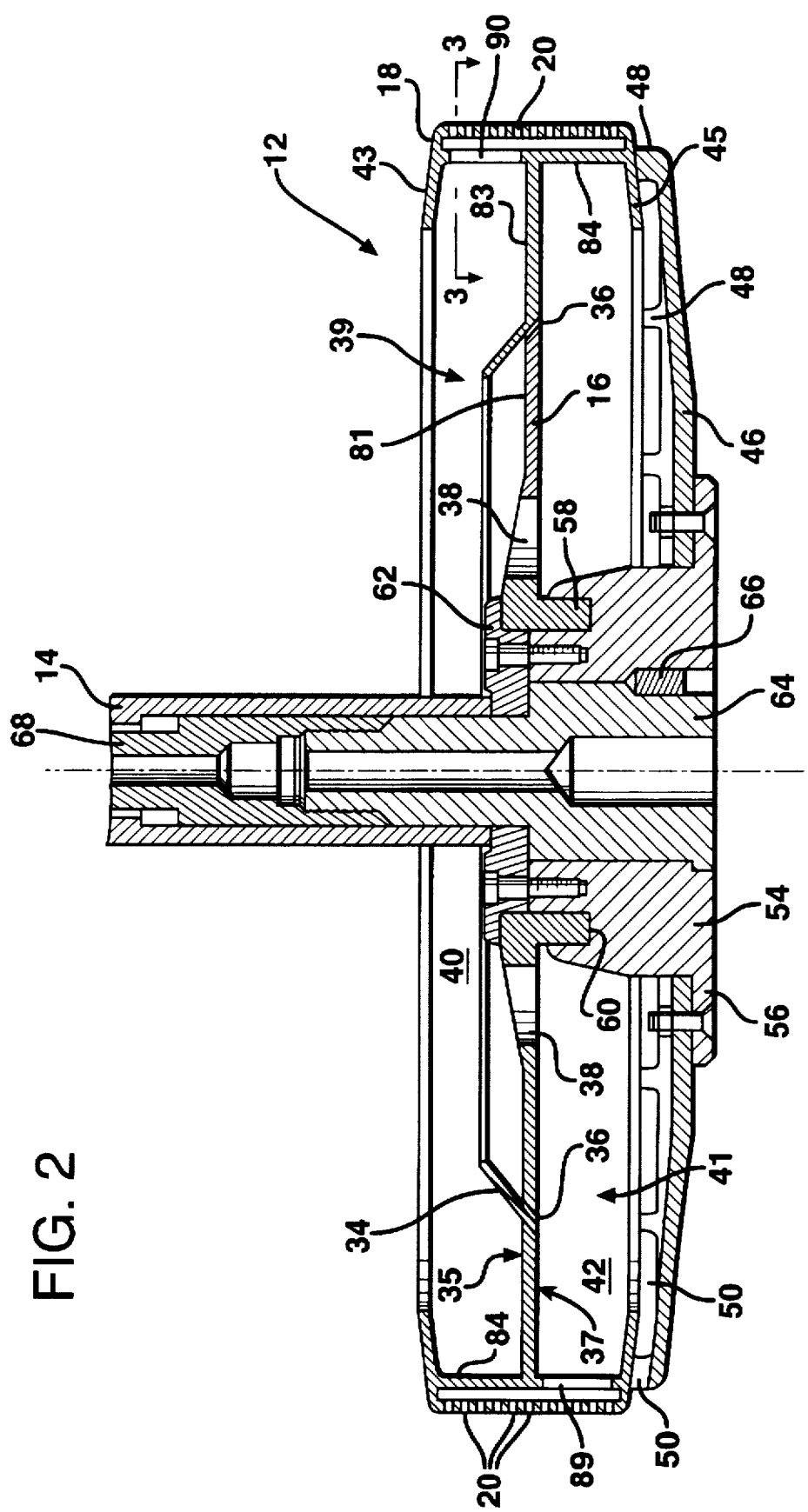
FIG. 2 is a cross-sectional view in elevation of an alternative embodiment of the spinner of FIG. 1, mounted at the end of the spindle.

Referring to FIGS. 1 and 2, a fiber manufacturing apparatus or fiberizer 10 includes a centrifuge or spinner 12 fixed to the lower end of a rotatable hollow shaft or spindle 14. The spinner 12 is rotated by rotating spindle 14, as is known in the art. The spinner 12 includes a radial wall 16 that extends radially out from the spindle 14 and has an outer periphery. An outer peripheral wall 18 is disposed around the outer periphery of the radial wall 16 and has a plurality of orifices 20 for centrifuging fibers 22 of a molten thermoplastic material, for example glass. FIGS. 1, 2 and 2A–2D show alternative embodiments of the spinner 12. Since these spinners 12 include many components which are substantially identical or at least similar, such components are indicated by the same numerals and are not explained repeatedly herein.

The rotation of the spinner 12 (as depicted by the circular arrow in FIG. 1 centrifuges molten glass through the orifices 20 in spinner peripheral wall 18 to form primary fibers 22. The primary fibers 22 are maintained in a soft, attenuable condition by the heat of an annular burner 24. A plurality of internal burners 26 are circumferentially disposed around spindle 14 and used to heat the interior of spinner 12 to prevent the molten thermoplastic material from solidifying or devitrifying before being formed into fibers. An annular blower 28, using induced air through passage 30, is positioned to pull primary fibers 22 and further attenuate them into secondary fibers 32, suitable for use in a product, such as wool insulating materials. The secondary fibers 32 are then collected on a conveyor (not shown) for formation into a product, such as a glass wool pack.

The spinners 12 of FIGS. 1 and 2 each has an integrally formed circular dam 34 extending up from the upper surface 35 of radial wall 16 and angling back toward the axis of rotation of spindle 14. A plurality of circumferentially spaced flow holes 36 are formed through radial wall 16, connecting its upper surface 35 and lower surface 37. Each flow hole 36 is formed through radial wall 16 just on the inside of dam 34 at an acute angle to wall 16. Dam 34 is formed at a similar acute angle to radial wall 16. A plurality of gas vent holes 38 are formed through radial wall 16 to provide paths for the hot exhaust gases from the internal burners 26 to flow through radial wall 16. These hot gases flow from burners 26, through a top opening 39 formed by an upper annular lip 43 and into an upper chamber 40 of spinner 12 formed above the radial wall 16 (see FIG. 2). The hot gases then flow through the vent holes 38, into a lower chamber 42 formed below radial wall 16 and through a bottom opening 41 formed by a lower annular lip 45. The spinner 12 is open at its top and bottom, at least in part, so that it is radially balanced during the centrifuging of fibers. The gas vent holes 38 can cause some of the hot gases to flow back out of the top opening 39 and over the outer surface of the peripheral wall 18. As discussed below, this overflow of hot exhaust gases can be desirable.

It is important for the upper and lower chambers 40 and 42 of the spinner 12 to remain at a temperature which allows the molten thermoplastic material to readily flow. Therefore, a portion 44 of the fiberizer 10, typically a bearing housing, directly above the spinner 12 is operatively adapted to substantially cover the top opening 39 of spinner 12. A circular plate or radiation shield 46 is used to substantially cover the bottom opening 41 of spinner 12. In this way, the desired high temperature can be maintained inside spinner 12. Preferably, a plurality of circumferentially separated spacers 48 are formed along the outer periphery of shield 46. These spacers 48 maintain the shield 46 a minimum distance from the spinner 12.

A plurality of gaps 50 are formed around the outer periphery of shield 46, one gap 50 between any two adjacent spacers 48. These gaps 50 provide a path for the exhaust gases from the burners 26 to flow through and exit out of lower chamber 42, improving the circulation and flow of the gases through the spinner. The lower corner of the peripheral wall of some prior art spinners have experienced cooling problems, resulting in the thermoplastic material solidifying prematurely. This undesirable cooling is believed to be caused by insufficient circulation of the hot gas in the spinner's lower chamber 42. Allowing the hot gas to flow out of the lower chamber 42, for example, through the gaps 50 can solve this problem.

Exhaust gases entering the upper chamber 40 from burners 26 are also able to flow through and out of the upper chamber 40 through a space 52 formed between the spinner 12 and the housing portion 44 (see FIG. 1). In this way, hot exhaust gases from burners 26 are able to circulate adjacent to the top and bottom of the peripheral wall 18, thereby controlling the temperature profile over the entire spinner wall 18.

Maintaining a more uniform temperature profile throughout the interior of spinner 12 helps to ensure that the thermoplastic material remains sufficiently molten to properly flow at the bottom as well as the top of peripheral wall 18 and through the orifices 20. The temperature balance over the height of the peripheral wall 18 can be adjusted by changing the relative sizes of the top and bottom gaps 52 and 50. Increasing the size of the bottom gap 50 relative to the top gap 52 has been found to increase the temperature at the bottom of the spinner wall 18 and vice versa. In this way, the optimum temperature distribution over the wall 18 can be achieved. This can result in improved fiber forming conditions, high spinner corrosion life, and the elimination of glass devitrification at the bottom of the peripheral wall 18.

Preferably, the heat shield 46 is a separate element from the radial wall 16 and peripheral wall 18 so that the mass of shield 46 has little, if any, effect on the radial balance of the spinner 12. Both the radial wall 16 of spinner 12 and the heat shield 46 are mounted on a hub 54, as described below. By separately mounting the shield 46 to the hub 54, the radial wall 16 and the peripheral wall 18 of the spinner 12 can remain radially balanced independent of how the shield 46 deforms during centrifuging. Preferably, the spinner 12, at least the radial wall 16, the hub 54 and, for the embodiments of FIGS. 2A–2D described below herein, the radial extension 100 are made from materials having similar coefficients of expansion.

The hub 54 is mounted for rotation with the lower end of spindle 14. Hub 54 includes a lower circular shoulder 56, upon which the shield 46 rests and, preferably, is secured with, for example, a plurality of circumferentially spaced bolts and nuts. The radial wall 16 includes a circular flange 58 which defines a central hole in the wall 16. The circular flange 58 is seated in a matching circular groove 60 formed in the top of the hub 54. A circular clamping plate or ring 62 is bolted onto the top of hub 54 and over the radial wall 16 so as to secure the flange 58 in the groove 60.

Being subjected to high temperatures while in use, the central hole of the radial wall 16 tends to increase in diameter over time relative to the hub 54, due to thermal expansion, rotational stresses and creep. If its central hole is allowed to so expand, the spinner 12 may move off-center from the rotating shaft 14, resulting in excessive vibration and warping. This problem becomes more pronounced as the size of the spinner 12, and thus the diameter of the central hole, increases. By being mounted on the hub 54, for example, as described above, the central hole of the radial wall 16 can be prevented from expanding an appreciable amount away from the hub 54.

A hollow quill 64 is press fit in a bore hole formed through the center of the hub 54 and locked in place, for example, with three circumferentially spaced locking pins 66. The upper end of the quill 64 is threaded into the lower end of a hollow drawbar 68. The drawbar 68 is spring loaded at the upper end of the spindle 14 to draw the plate 62, along with the quill 64 and the hub 54, up against the lower end of spindle 14. The quill 64 is partially cooled by circulating cooling air through a stepped bore formed through the drawbar 68 and into another stepped bore formed through the quill 64. The quill 64 is preferably cooled further with water circulated through an annular cooling jacket 70 disposed around the spindle 14 and the quill 64 and above the hub 54. The quill 64 and the hub 54 are each fabricated from a low thermal expansion alloy to minimize differential thermal expansion between them.

It is important to maintain the concentric relationship between the spinner 12 and the spindle 14. Allowing the spinner 12 to move off-center while centrifuging can cause excessive vibration and warping of the spinner 12. This has posed a serious problem with prior fiberizers. Therefore, the present invention preferably includes structure for keeping the spinner 12 centered on the hub 54 and the quill 64. For example, one way of keeping the spinner 12 centered includes adapting the outside diameter of the spinner flange 58 to snugly fit against the inside surface of the hub groove 60. With the quill 64 and the hub 54 being made of low thermal expansion material and cooled as previously described, the spinner flange 58 forms a tighter fit against the inside surface of the groove 60 as the flange 58 grows due to thermal expansion, rotational stresses and/or creep.

During the operation of the fiberizer 10, the radial wall 16 may become susceptible to thermal expansion cracking at the vent holes 38. To prevent such premature cracking of the radial wall 16, the thickness of the radial wall 16 in the area surrounding each vent hole 38 (see FIG. 2) may be embossed or otherwise increased. As another option, the shape of each vent hole 38 could be changed so as to be less of a stress concentrator. For example, each vent hole 38 could be made oval in shape, instead of circular, with the major axis of each oval hole being oriented to curve in a circumferential manner around the spinner flange 58. Alternatively, if necessary, each vent hole 38 can be modified both by being made oval in shape and by embossing the area around each hole 38. As a further option to avoid, or at least limit, thermal stress cracking, a two piece spinner 12 can be used, where the radial wall 16 is mounted to the hub 54 through a radial extension 100, such as that shown in FIGS. 2A–2D and described below. To increase its resistance to thermal stresses, the wall of the radial extension 100 should be made relatively thick for added strength.

Referring to the spinners 12 illustrated in FIGS. 1, 2 and 2A–2D, the interior of the spinner 12 is supplied with two separate streams of molten thermoplastic material, for example, a first stream 78 containing glass A and a second stream 80 containing glass B. Conventional supply equipment can be used to supply these streams 78 and 80 of molten glass. Such molten glass supply equipment is well known in the industry and, therefore, will not be discussed in detail herein. Streams 78 and 80 can be disposed adjacent one another on the same side of spindle 14 but are preferably disposed to drop glasses A and B on opposite sides of spinner 12, as shown in FIG. 1. As an alternative to containing a single molten thermoplastic material, it may be desirable for each stream 78 and 80 to contain a mixture of two or more molten thermoplastic materials (e.g., two or more glasses). In addition, each stream 78 and 80 may contain the same molten thermoplastic material.

Referring to the spinners 12 of FIGS. 1 and 2, the glass in both streams 78 and 80 drops directly onto the upper surface 35 of spinner radial wall 16 and flows outwardly due to the centrifugal force toward spinner peripheral wall 18. Glass A in molten glass stream 78 is positioned radially closer to spindle 14 and lands on an inner portion 81 of the upper surface 35, radially inside of dam 34. A build-up or head of Glass A is first formed against dam 34. Glass A then flows through the flow holes 36, from the upper side to the underside of radial wall 16. The flow holes 36 are sized and numbered to ensure that glass A does not escape over dam 34. Glass A continues to flow along the underside of wall 16 and towards peripheral wall 18, as shown. Glass B in molten glass stream 80 is positioned radially further from spindle 14 and lands on an outer portion 83 of the upper surface 35, radially outside of dam 34. Glass B then flows directly toward peripheral wall 18, as shown in FIG. 1.

Figure 2A:
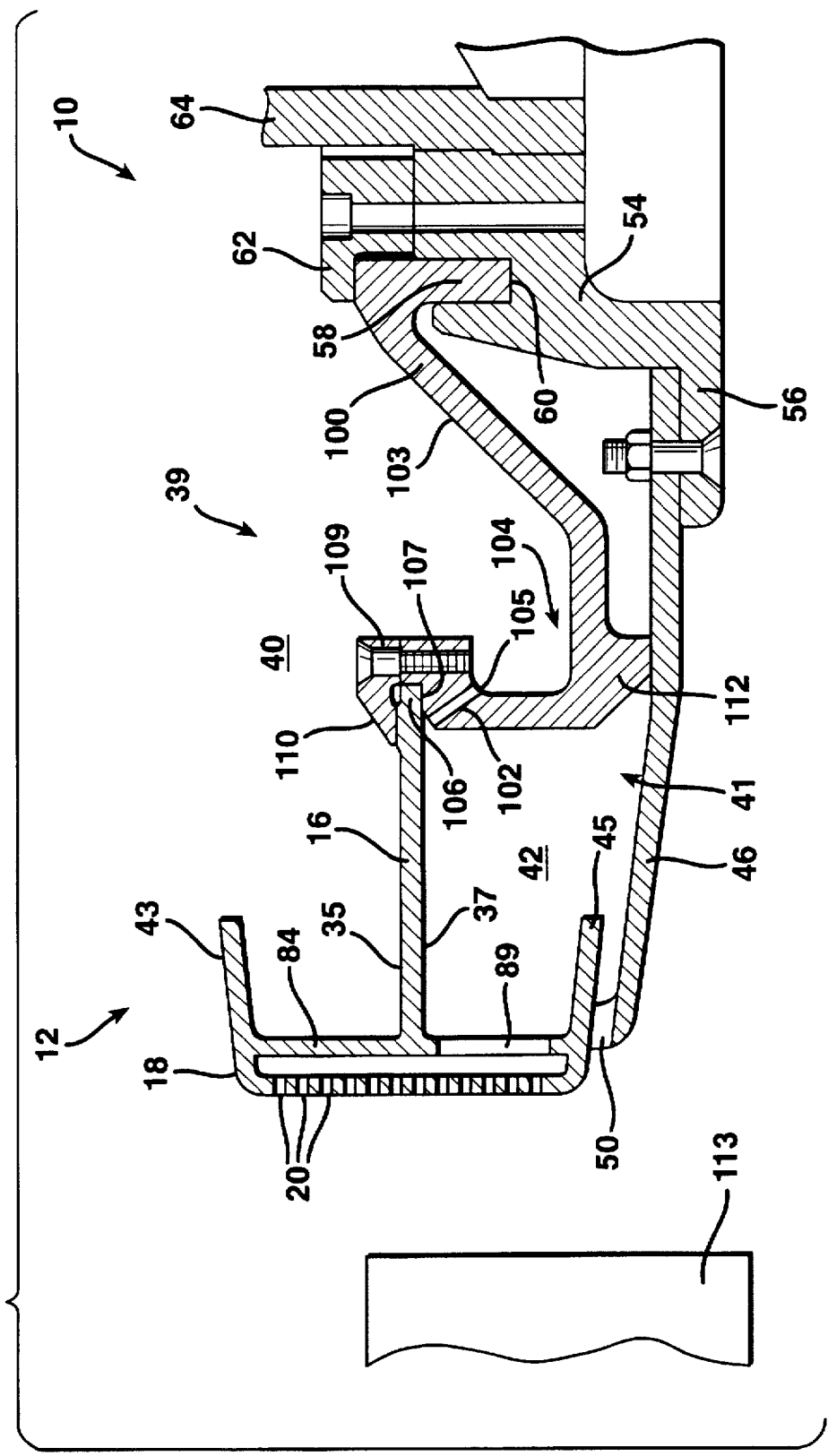
FIG. 2A is a cross-sectional view in elevation showing half of another alternative embodiment of the spinner of FIG. 1, mounted at the end of the spindle.
Figure 2B:
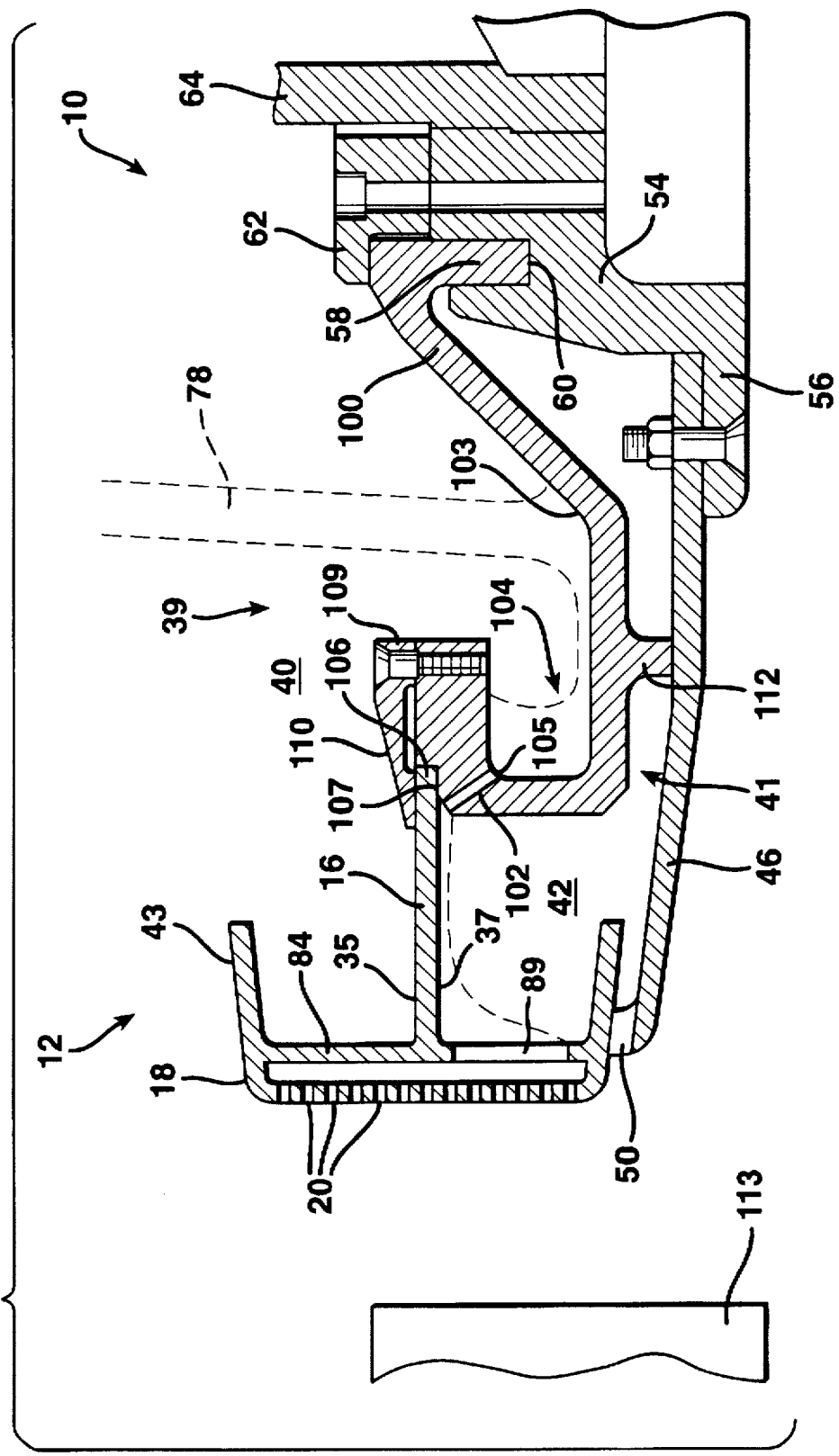
FIG. 2B is a cross-sectional view in elevation showing half of a modification of the spinner embodiment of FIG. 2A.
Figure 2C:
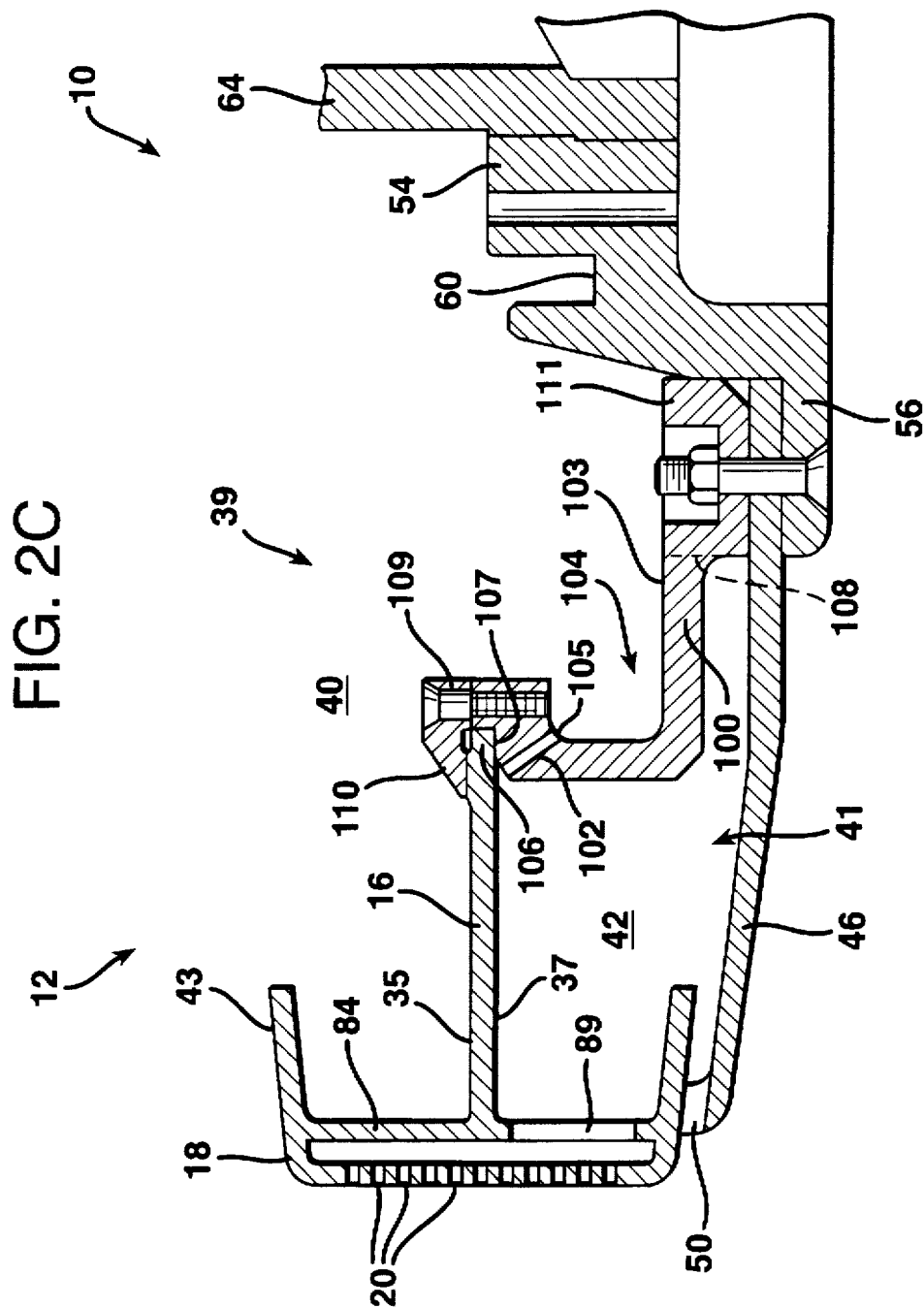
FIG. 2C is a cross-sectional view in elevation showing half of an additional alternative embodiment of the spinner of FIG. 1, mounted at the end of the spindle.
Figure 3:
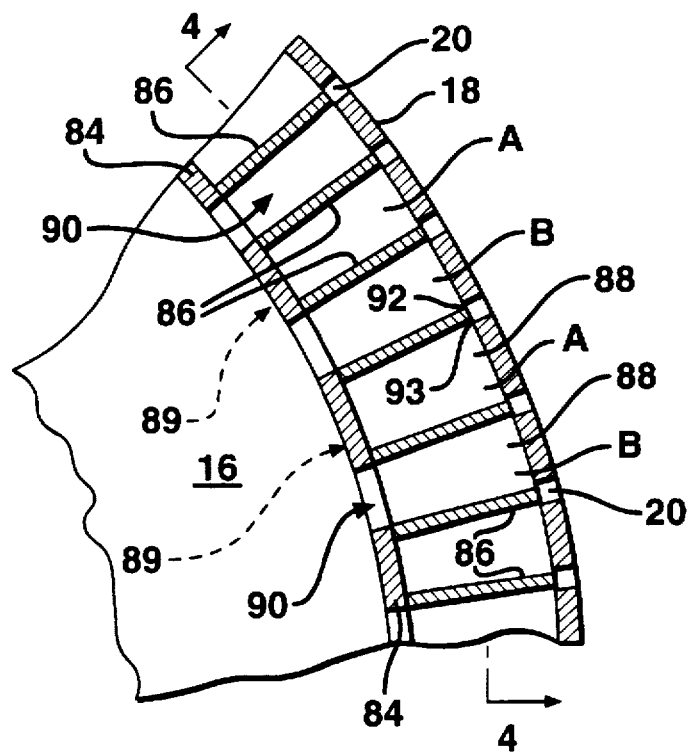
FIG. 3 is a plan view of a portion of the spinner of FIG. 2, taken along line 3—3.

As best shown in FIG. 3, the spinners 12 of FIGS. 1, 2 and 2A–2D are each adapted with a vertical interior wall 84 which is generally circumferential and positioned radially inwardly from the spinner peripheral wall 18. As they flow toward peripheral wall 18, glasses A and B build-up against interior wall 84, above and below radial wall 16, respectively. The upper and lower annular lips 43 and 45 help to ensure that the molten material does not flow around interior wall 84 and beyond the peripheral wall 18 (see FIG. 1). Continuing with FIG. 3, a series of vertical baffles 86, positioned between spinner peripheral wall 18 and vertical interior wall 84, divide that space into a series of generally vertically-aligned compartments 88 which run substantially the entire height of spinner peripheral wall 18. Alternate compartments contain glass A and glass B which flow, respectively, into compartments 88 through slots 89 and 90 (see FIG. 1) formed in interior wall 84.

Figure 4:
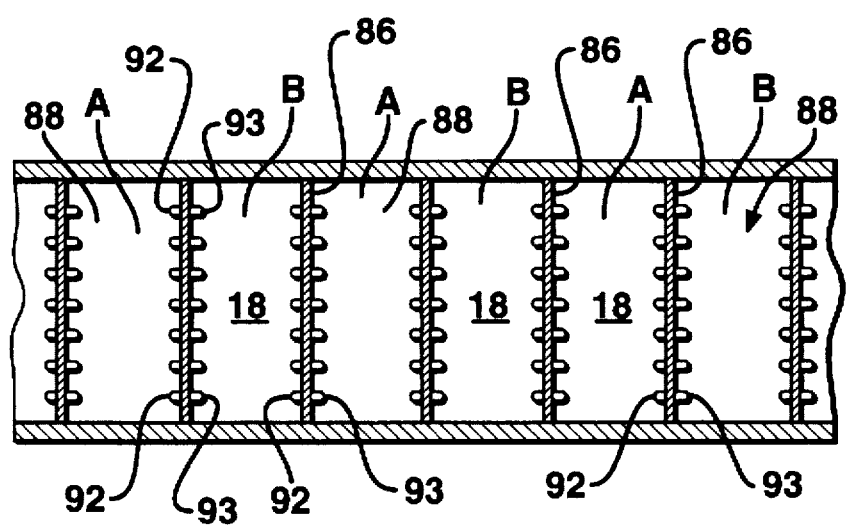
FIG. 4 is a cross-sectional view in elevation of the spinner of FIG. 3, taken along line 4—4.

The orifices 20 on spinner peripheral wall 18 are each positioned adjacent to, and in general alignment with, the radial outward edges of the vertical baffles 86. As can be seen in FIG. 4, a series of passages 92 and 93 are located in each of the compartments 88 through which molten thermoplastic material will flow. Preferably, these passages are located adjacent either side of baffles 86 and communicate with orifices 20 on the outer surface of peripheral wall 18.

As shown, the passages 92 and 93 are generally vertically aligned and are preferably sized to provide equal flow lengths for the A and B glass components in adjacent compartments 88. This ensures that when the A and B components exit orifices 20 in side-by-side relation, there will be approximately equal amounts of A and B glasses for each fiber. If unequal amounts of A and B glasses are desired, however, the passages 92 and 93 may be sized to provide for unequal amounts of flow causing unequal proportions in the resulting dual component fiber. Such a result may be desirable in certain instances. Additionally, the passages in each compartment may be modified to provide a variation in the ratios and configuration of A and B glasses in the dual component fibers formed. The number of passages formed depends on the height of the spinner peripheral wall 18. The number and size of the passages, as well as the flow rate of the molten glasses into compartments 88, is chosen to build up a "head" of molten material covering the passages in each compartment.

Each of the alternative embodiments of the spinner 12 shown in FIGS. 2A–2D includes a radial extension 100, a truncated radial wall 16, and an outer peripheral wall 18. The radial extension 100 is mountable to the shaft 14 so as to extend radially out therefrom. The radial wall 16 is mounted to and extends radially out from the radial extension 100 and has an outer periphery. The outer peripheral wall 18 is disposed around the outer periphery of the radial wall 16 and has a plurality of orifices 20 for centrifuging fibers from molten thermoplastic material. The spinners 12 of FIGS. 2A–2D, with their radial extensions 100, have been found to be less susceptible to thermal stress induced cracking than the other spinners 12 described above.

As the spinner 12 rotates, centrifugal forces cause the molten thermoplastic material deposited on the spinner 12 to flow radially outward. The radial wall 16 has an upper surface 35 which directs the flowing molten material, deposited onto the upper surface 35, toward orifices 20 of the peripheral wall 18. The radial extension 100 includes an upper surface 103 which directs flowing molten material, deposited onto the upper surface 103, into a plurality of flow holes 102 and through the radial extension 100. Once through the radial extension 100, the molten material flows to a lower surface 37 of the radial wall 16 and toward the same or other orifices 20 of the peripheral wall 18. As discussed below, when single component fibers are being formed, the flow holes 102 may be operatively adapted so that more molten thermoplastic material flows to the orifices 20 above the radial wall 16 than flows to the orifices 20 below the radial wall 16.

A portion of the upper surface 103 of the radial extension 100 is located underneath the lower surface 37 of the radial wall 16 and defines an annular trap 104 (e.g., an annular channel). The trap 104 forms the molten thermoplastic material deposited on the upper surface 103 into a head to ensure coverage of the entrance 105 of each flow hole 102, as the spinner 12 rotates (see FIG. 2B).

The radial wall 16 has an inner annular edge 106 which rests on an outer annular ledge 107 formed around the radial extension 100 when the radial wall 16 is mounted to the radial extension 100. The inner annular edge 106 is secured from lifting off of the ledge 107 with, for example, some form of a clamp 109. As shown, the clamp 109 is ring-shaped and boltable to the radial extension 100 so as to extend over the ledge 107. In this way, the inner edge 106 of the radial wall 16 is clamped between the ledge 107 and the ring-shaped clamp 109. The clamp 109 may include an annular upper surface 110 that is beveled for directing molten thermoplastic material, deposited thereon, radially outward onto the upper surface 35 of the radial wall 16, as the spinner 12 rotates.

Each of the spinners 12 of FIGS. 2A–2D has an upper chamber 40 and a lower chamber 42, above and below the radial wall 16 and the radial extension 100, respectively. As shown in the embodiments of FIGS. 2C and 2D, the radial extension 100 may have at least one opening 108 connecting the upper chamber 40 and the lower chamber 42 such that a hot gas (e.g., air, combustion gases, etc.) in the upper chamber 40 can circulate into the lower chamber 42 through the opening 108, represented by the arrows shown in FIG. 2D. See the discussion above, with regard to the openings 38, for related information.

Hot air, exhaust gas or some other gas is often used to help melt the thermoplastic material and keep it in its molten state until the fibers are formed. The flow of hot gas over the top and bottom of the peripheral wall 18 can be used to control the temperature distribution over the peripheral wall 18. The gap 50 formed between the shield 46 and the peripheral wall 18 of the spinner 12 allows the hot gas to flow over the bottom of the peripheral wall 18 and helps ensure that all the thermoplastic material located in the area of the peripheral wall 18 remains molten.

In addition, or as an alternative, to being heated by circulating a hot gas, a ring-shaped induction heater 113 can be disposed around the outside of the spinner 12, as shown in FIGS. 2A and 2B. Such an induction heater 113 can be obtained from Alpha 1, a company in Columbus, Ohio, which manufactures induction heaters. The induction heater 113 induces a current in the spinner 12 so as to increase the temperature of at least the peripheral wall 18, and possibly part of the radial wall 16. The use of such an induction heater 113 is particularly desirable for the spinners 12 of FIGS. 2A and 2B, which do not include any type of hot gas circulation openings 108.

Preferably, the apparatus 10 using one of the spinners 12 of FIGS. 2A–2D includes a removable or fixed heat shield 46 for substantially covering the bottom opening 41. When such a heat shield 46 is used, the radial extension 100 of the spinners 12 of FIGS. 2A and 2B preferably includes a support spacer 112, for supporting the radial extension 100 above the shield 46. Such a spacer 112 does not appear to be needed for the radial extension 100 of the spinners 12 of FIGS. 2C and 2D.

The spinners 12 of FIGS. 2A–2D can be mounted to the shaft 14 a number of ways. For example, the spinners 12 can be mounted to the shaft 14 with the same hub 54 as described above for the apparatus 10 of FIGS. 1 and 2. For the spinners 12 of FIGS. 2A and 2B, the radial extension 100 includes an annular flange 58, like that described above for the spinners 12 of FIGS. 1 and 2, which is secured into an annular groove 60 formed into the top of the hub 54 using a ring-shaped clamp 62. Alternatively, the radial extension 100 can be mounted to the shoulder 56 of the hub 54.

For the spinners 12 of FIGS. 2C and 2D, the radial extension 100 has an annular rim 111, instead of the annular flange 58. The rim 111 is mounted to the shoulder 56, for example, by being bolted to the shoulder 56 using the same circumferentially spaced bolts as those used to secure the shield 46. For the spinners 12 of FIGS. 2C and 2D, a plurality of openings 108 are formed through the rim 111 (see FIG. 2D). The openings 108 provide a plurality of paths for a hot gas to pass from the upper chamber 40 and through the radial extension 100 to the lower chamber 42. The openings 108 are circumferentially spaced around the rim 111 and between the bolts that are securing the shield 46 and the rim 111 to the shoulder 56. The openings 108 may be, for example, in the form of scallop cutouts.

Two streams 78, 80 of different, or the same, molten thermoplastic materials are supplied to the spinners 12 of FIGS. 2A–2D. One stream 78 of molten material is deposited onto the upper surface 103 of the radial extension 100 (shown in phantom in FIG. 2B) and the other stream 80 of molten material is deposited onto the upper surface 35 of the radial wall 16, in the same manner as shown in FIG. 1.

As each of the spinners 12 of FIGS. 2A–2D rotate, the molten thermoplastic material from stream 78 flows radially outward across the upper surface 103 of the radial extension 100 and through the flow holes 102. Once through a flow hole 102, the molten material flows radially outward across the lower surface 37 of the radial wall 16, against the portion of the interior wall 84 extending below the radial wall 16, through the openings 89 and out the fiber forming orifices 20 in the peripheral wall 18. At the same time, the molten thermoplastic material from stream 80 flows radially outward across the upper surface 35 of the radial wall 16, against the portion of the interior wall 84 extending above the radial wall 16, through the openings 90 (see FIG. 3) and out the fiber forming orifices 20 in the peripheral wall 18.

While the molten materials from the two different streams 78 and 80 can be channeled together into the same orifices 20 to form two-component fibers (see for example FIGS. 3 and 4), the apparatus 10 of FIGS. 2A–2D can be adapted to centrifuge single component fibers as well as multiple component fibers. For example, the streams 78 and 80 can be the same molten thermoplastic material, for single-component fibers, or different molten materials, for dual-component fibers, respectively.

Single component fibers can also be formed by using two streams of the same molten material, eliminating the interior wall 84 and the baffles 86, and extending the radial wall 16 out to divide the outer peripheral wall 18 into an upper and lower section, above and below the radial wall 16, respectively. Using the radial wall 16 to divide the outer peripheral wall 18 results in the orifices in the upper section of the peripheral wall 18 being supplied with molten material from the stream 80 and orifices in the lower section of the peripheral wall 18 being supplied with molten material from the stream 78.

Two or more molten thermoplastic materials, as used herein, are considered to be different materials if there is some difference between them (e.g., composition, temperature, etc.) which can affect the properties of the formed fibers 32. A single molten thermoplastic material, as used herein, can be a single material or a mixture of multiple materials.

Because molten thermoplastic material flows against the walls 18 and 84 above and below the radial wall 16, the spinners 12 of FIGS. 2A–2D should also include an upper lip 43 and a lower lip 45, or other structure, to help ensure that the molten material does not flow around the peripheral wall 18. The flow holes 102 can also be sized and numbered to control the flow rate of the molten thermoplastic material and help ensure that the molten material does not escape over the lower lip 45. By allowing the molten thermoplastic material to flow radially across both the upper and lower surfaces 35 and 37 of the radial wall 16, the overall mass added to the spinner 12 by the molten material is more evenly distributed and has less of an effect on the radial balance of the spinner 12 during the centrifuging process.

When single-component fibers are being made, as described above using the two streams 78 and 80 and with the interior wall 84 and the baffles 86 being eliminated, the flow holes 102 should be operatively adapted in number and/or size so that molten thermoplastic material flows to the orifices 20 above and below the radial wall 16 in a ratio other than 50/50. Preferably, the flow holes are adapted to allow more molten thermoplastic material to flow to the orifices above the radial wall 16 than below the radial wall 16. Satisfactory results have been obtained when molten thermoplastic material flows to the orifices 20 above and below the radial wall 16 in a ratio ranging from about 60/40 to about 80/20.

In addition, supplying more of the molten material from the stream 78 to the orifices 20 above the radial wall 16 has been found to cause the resulting upper fibers 22 to have a further trajectory (i.e., to extend further out than the lower fibers 22 formed from the orifices 20 below the radial wall 16. This difference in trajectory has been found to help reduce contact between the fibers 32, thereby reducing surface defects and fiber fractures that can result from such contact. In addition, the upper chamber 40 of the spinner 12 is often hotter than the lower chamber 42. This temperature difference can cause the orifices 20 above the radial wall 16 to corrode and open up (i.e., become larger faster than the orifices 20 below the radial wall 16. As the orifices 20 above the radial wall 16 become larger, supplying more of the molten material 78 through the flow holes 94 helps to prevent a shortage of the molten material at the upper orifices 20. In this way, the throughput and corrosion life of the spinner 12 can be optimized.

The spinners 12 of FIGS. 2A–2D are operatively adapted so that they remains substantially balanced radially during the centrifuging operation. That is, deformation of the radial wall 16 and the peripheral wall 18 during centrifuging is substantially radial in nature rather than asymmetrical.

The spinners 12 may be adapted in a number of ways in order to remain radially balanced to a substantial degree during centrifuging. For example, the peripheral wall 18 may be disposed around and joined to the outer periphery of the radial wall 16, with a portion of the peripheral wall 18 being disposed above and below the radial wall 16 such that deformation of the radial wall 16 and the peripheral wall 18 during the centrifuging of fibers is substantially radial in nature rather than asymmetrical. In addition, the peripheral wall 18 may be adapted so that its mass is substantially the same both above and below the radial wall 16. Evenly distributing the mass of the peripheral wall 18 above and below the radial wall 16 can be accomplished in a number of ways. For example, the peripheral wall 18 can be made symmetrical above and below the radial wall 16. To maintain symmetry, the upper and lower lips 43 and 45 should be similar in structure and mass so as to counter balance each other. Likewise, the top and bottom openings 39 and 41 should be of similar size and structure.

The problem of temperature induced asymmetrical (i.e., non-radial) deformation is expected to become more pronounced for prior art spinners as the outer diameter of the spinner increases, especially for spinners having an outer diameter of at least about 12 inches (about 30.5 cm) or more. Such deformation is also expected to increase when the mass at the outer peripheral wall area of the spinner increases, as is often the case with outer peripheral walls adapted for making multiple component fibers. In both instances, the increase in asymmetrical deformation is due in large part to a resulting increase in moment forces acting downward at the outer periphery of the spinner. The present invention enables such detrimental deformation to be substantially limited, if not eliminated, even for large diameter spinners and those designed to make multiple component fibers.

From the above disclosure of the present invention and the preceding detailed description, those skilled in this art will readily comprehend the various modifications to which the present invention is susceptible. For example, while the embodiment described in detail above is adapted for making dual-component fibers, the present invention may also be used with embodiments adapted form making single component fibers as described above. Therefore, the scope of the invention should be limited only by the following claims and equivalents thereof.

I claim:

1. A spinner mountable to rotate on a shaft in a fiberizer, said spinner comprising:

a radial extension mountable to the shaft so as to extend radially out therefrom and having at least one flow hole operatively adapted for allowing molten thermoplastic material to flow through said radial extension as said spinner operates;

a radial wall mounted to and extending radially out from said radial extension and having an outer periphery; and an outer peripheral wall disposed around the outer periphery of said radial wall and having a plurality of orifices for centrifuging fibers from molten thermoplastic material, wherein molten thermoplastic material flows through said at least one flow hole and to orifices of said peripheral wall, as said spinner rotates.

2. The spinner as set forth in claim 1, wherein said radial wall has an upper surface operatively adapted for directing molten thermoplastic material deposited thereon toward orifices of said peripheral wall, as said spinner rotates.

3. The spinner as set forth in claim 1, wherein said radial wall includes a lower surface, said radial extension includes an upper surface, and said radial extension is operatively adapted for directing molten thermoplastic material deposited on said upper surface through said at least one flow hole to said lower surface and toward orifices of said peripheral wall, as said spinner rotates.

4. The spinner as set forth in claim 3, wherein a portion of said upper surface of said radial extension is underneath said lower surface of said radial wall.

5. The spinner as set forth in claim 3, wherein said at least one flow hole has an entrance, and a portion of said upper surface defines an annular trap operatively adapted for providing a head of the molten thermoplastic material, deposited on said upper surface, at the entrance of said at least one flow hole, as said spinner rotates.

6. The spinner as set forth in claim 5, wherein said annular trap is underneath said lower surface of said radial wall.

7. The spinner as set forth in claim 1, wherein said radial wall has an inner annular edge, said radial extension has an outer annular ledge, and said inner annular edge rests on said outer annular ledge when said radial wall is mounted to said radial extension.

8. The spinner as set forth in claim 7, wherein said spinner includes a clamp for securing said inner annular edge on said outer annular ledge, when said radial wall is mounted to said radial extension.

9. The spinner as set forth in claim 8, wherein said clamp includes an annular upper surface that is beveled for directing molten thermoplastic material, deposited thereon, onto said upper surface of said radial wall, as said spinner rotates.

10. The spinner as set forth in claim 1, wherein said spinner includes an upper chamber, above said radial wall and said radial extension, and a lower chamber, below said radial wall and said radial extension, and said radial extension has at least one opening connecting said upper chamber and said lower chamber such that a hot gas in said upper chamber can circulate into said lower chamber through said opening.

11. The spinner as set forth in claim 1, wherein said spinner is operatively adapted to be radially balanced such that deformation of said radial wall and said peripheral wall during centrifuging is substantially radial in nature rather than asymmetrical.

12. An apparatus for making fibers comprising:

a shaft;

a spinner mounted to said shaft so as to rotate, said spinner comprising:

a radial extension mounted to and extending radially out from said shaft and having an upper surface and at least one flow hole, a radial wall mounted to and extending radially out from said radial extension and having an upper surface and an outer periphery, and an outer peripheral wall disposed around the outer periphery of said radial wall and having a plurality of orifices for centrifuging fibers from molten thermoplastic material; and a source for supplying molten thermoplastic material onto said upper surface of said radial extension and onto said upper surface of said radial wall, wherein the molten thermoplastic material supplied onto said upper surface of said radial extension flows through said at least one flow hole and to orifices of said peripheral wall and the molten thermoplastic material supplied onto said upper surface of said radial wall flows to orifices of said peripheral wall, as said spinner rotates.

13. The apparatus as set forth in claim 12, wherein said radial wall includes a lower surface, and said radial extension is operatively adapted so that molten thermoplastic material supplied onto said upper surface of said radial extension is directed through said at least one flow hole, across said lower surface and to orifices of said peripheral wall, as said spinner rotates.

14. The apparatus as set forth in claim 12, wherein said spinner has a bottom opening and said apparatus further comprises a heat shield operatively adapted and disposed to substantially cover the bottom opening of said spinner.

15. The apparatus as set forth in claim 14, wherein said radial extension includes a support spacer for supporting said radial extension above said shield.

16. The apparatus as set forth in claim 12, wherein said apparatus further comprises a hub mounted to said shaft, said hub has a shoulder and said radial extension is mounted to said shoulder.

17. The apparatus as set forth in claim 16, wherein said radial extension includes an annular rim mounted to said shoulder and said rim has at least one opening forming a path for a gas to pass through said radial extension.

18. The apparatus as set forth in claim 12, wherein said apparatus further comprises a hub mounted to said shaft, said radial extension includes at least one annular flange, and said hub includes at least one annular groove in which said at least one annular flange is secured.

19. The apparatus as set forth in claim 12, wherein said at least one flow hole is a plurality of flow holes, and said flow holes are operatively adapted so that more molten thermoplastic material flows to said orifices above said radial wall than flows to said orifices below said radial wall.

20. The apparatus as set forth in claim 12, wherein said apparatus further comprises an induction heater for inducing a current in at least said radial wall so as to increase the temperature of said radial wall.

21. An apparatus for making dual-component fibers comprising:

a rotatable shaft;

a spinner mounted to one end of said rotatable shaft so as to rotate therewith, said spinner comprising:

a top opening and a bottom opening, a radial extension positioned between said top opening and said bottom opening, the one end of said shaft extending down through said top opening, and said radial extension having an upper surface and a plurality of circumferentially spaced flow holes, and being mounted to and extending radially out from said shaft, a radial wall positioned between said top opening and said bottom opening, having an upper surface and a circular outer periphery, and being mounted to and extending radially out from said radial extension, and structure disposed around the outer periphery of said radial wall for centrifuging dual-component fibers from at least two molten thermoplastic materials; and a source for supplying one molten thermoplastic material onto said upper surface of said radial extension and another molten thermoplastic material onto said upper surface of said radial wall, wherein the one molten thermoplastic material supplied onto said upper surface of said radial extension flows through said plurality of flow holes and to said structure and the other molten thermoplastic material supplied onto said upper surface of said radial wall flows to said structure so as to form dual-component fibers as said spinner rotates.

* * * * *